Patented Aug. 16, 1932

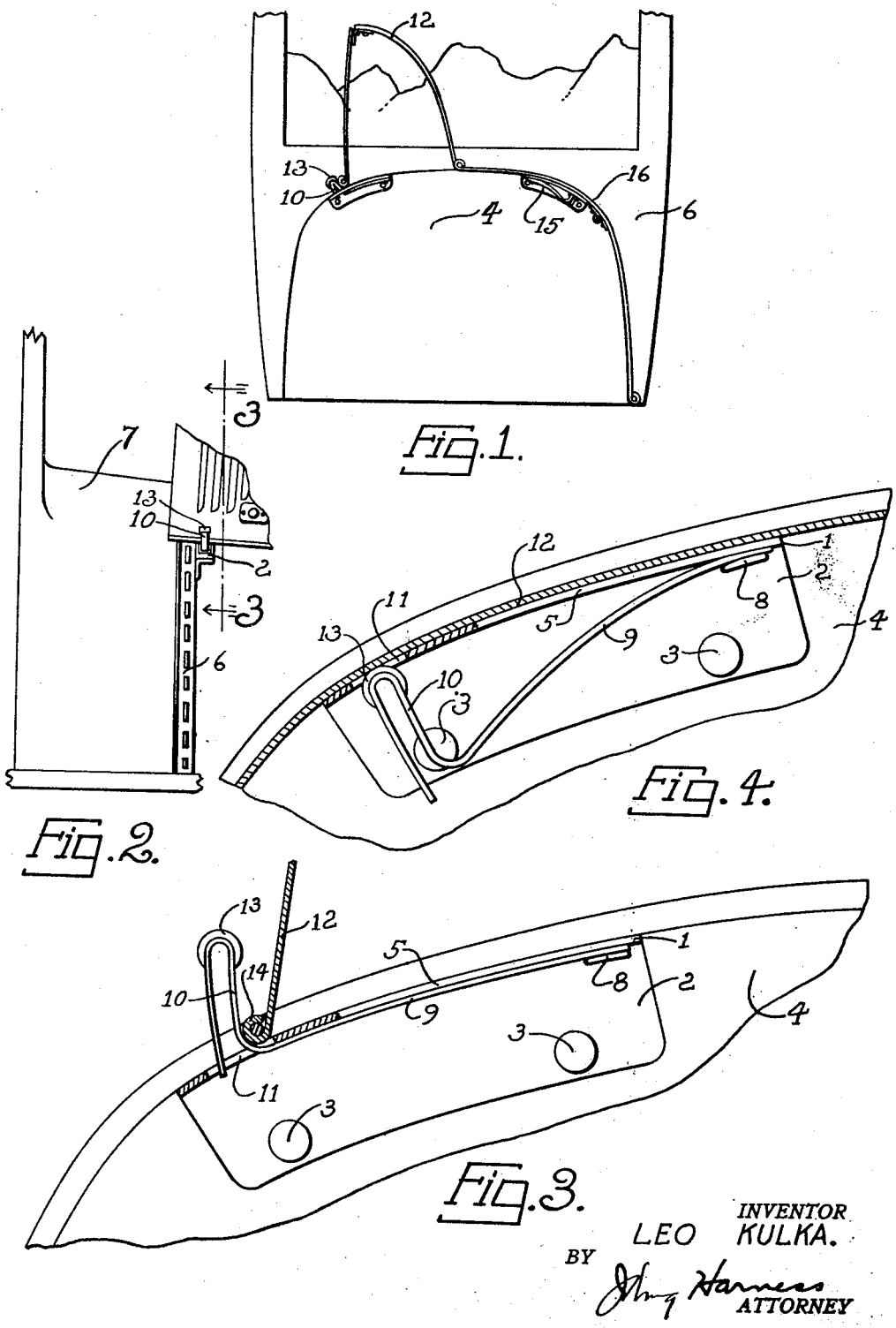

1,872,467

UNITED STATES PATENT OFFICE

LEO KULKA, OF DETROIT, MICHIGAN, ASSIGNOR TO CHRYSLER CORPORATION, OF DETROIT, MICHIGAN, A CORPORATION OF DELAWARE

HOOD REST

Application filed February 8, 1930. Serial No. 426,934.

The main objects of this invention are to provide an improved means for holding the hood of a vehicle in an open position; to provide means of this kind by which both sides of the vehicle hood may be held in an open position at the same time; to provide a resilient hood rest which is normally hidden from view when the hood is closed and which is adapted to automatically extend into an operative position and retract into an obscure position as the hood is opened and closed respectively; and to provide an inexpensive device of this kind which is adapted to be installed on vehicles of conventional construction without requiring alterations of the standard parts thereof.

An illustrative embodiment of the invention is shown in the accompanying drawing, in which:

Fig. 1 is a fragmentary front elevation of a vehicle body embodying my invention.

Fig. 2 is a fragmentary side elevation of the vehicle body.

Fig. 3 is a vertical section taken on line 3—3 of Fig. 2, showing a hood in an open position.

Fig. 4 is a section similar to Fig. 3, illustrating the hood in a closed position.

In the form shown, my improved hood rest includes an angle bracket 1 having a vertical side 2 which is rigidly secured by rivets 3, or by spot welding, to the dash 4 of the vehicle. The top side 5 of the bracket 1 is shaped to conform to the curvature of the hood seat 6 formed on the cowl 7 of the vehicle body.

Rigidly secured at 8 on the top side 5 of the bracket is an arm 9 which comprises a strip of resilient material such as spring steel. The free end of the strip 9 has an integral projection 10 thereon which is a looped extension of the strip. This projection registers with an aperture 11 in the upper side 5 of the bracket through which it extends as shown in Fig. 3, when the left half 12 of the hood of the vehicle is raised. A pad 13, preferably of rubber, is provided on the extremity of the projection 10 for protecting the inner surface of the hood.

In operation, when the left side 12 of the hood is in a closed position its inner surface bears upon the pad 13 of the projection 10 causing the strip 9 to be deflected as illustrated in Fig. 4 and holding the projection in a retracted and obscure position. When this part of the hood is lifted from its closed position, the resiliency of the strip 9 urges the projection 13 outwardly to the position shown in Fig. 3. The bead 14 of the edge of the hood may be engaged against the projection 10 which is inclined at an acute angle to the strip 9 so as to prevent the weight of the hood from urging the projection inwardly. As the hood section 12 is lifted from the position shown in Fig. 3, and moved to a closed position, it retracts the rest.

A similar hood holding device 15 is mounted on the right hand side of the dash 4 as viewed in Fig. 1, for holding the right half 16 of the hood in an open position. Both sections of the hood may be held in an open position at one time by their respective rests.

Although but one specific embodiment of this invention has herein been shown and described, it will be understood that various changes including the size, shape and arrangements of parts, may be made without departing from the spirit of my invention and it is not my intention to limit its scope other than by the terms of the appended claims.

I claim:

1. In a vehicle comprising a hood and a hood seat, a hood rest comprising a bracket located adjacent said hood seat, a resilient arm secured at one end on said bracket, and a projection on said arm spaced from the edge of said hood seat, said projection being normally extended above said seat so as to form a notch in conjunction with the latter when said hood is open and held in a retracted position by said hood when the latter is closed.

2. In a vehicle comprising a hood and a hood seat, means for holding a hood in an open position comprising an angle bracket having one side conforming with the curvature of said seat and located in proximity thereto, a resilient arm mounted on said bracket, and a projection on said resilient arm, said arm being adapted to retain said projection above said seat in the path of the edge of said hood when the latter is open and to permit said hood to urge said projection to a retracted position when said hood is closed.

3. In a vehicle having a hood and hood seat, means for holding the hood in an open position including an angle bracket having an upper side conforming with the curvature of said seat and located adjacent thereto and a lower side secured to said vehicle adjacent said hood seat, and a resilient arm attached at one end to said bracket having a projection adapted to extend above the upper side of said bracket and to form a notch in conjunction with the upper side of said bracket when the hood is open for receiving the latter.

LEO KULKA.